United States Patent
Moloian et al.

(10) Patent No.: US 10,360,356 B2
(45) Date of Patent: Jul. 23, 2019

(54) AUTHENTICATING USERS REQUESTING ACCESS TO COMPUTING RESOURCES

(71) Applicant: Bank of America Corporation, Charlotte, NC (US)

(72) Inventors: Armen Moloian, Thousand Oaks, CA (US); John H. Kling, Bellevue, KY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/784,282

(22) Filed: Oct. 16, 2017

(65) Prior Publication Data
US 2018/0039764 A1 Feb. 8, 2018

Related U.S. Application Data

(63) Continuation of application No. 15/048,283, filed on Feb. 19, 2016, now Pat. No. 9,824,196, which is a (Continued)

(51) Int. Cl.
*G06F 21/31* (2013.01)
*G06F 21/62* (2013.01)
(Continued)

(52) U.S. Cl.
CPC ............ *G06F 21/31* (2013.01); *G06F 21/40* (2013.01); *G06F 21/62* (2013.01);
(Continued)

(58) Field of Classification Search
CPC .......... G06F 21/31; G06F 21/40; G06F 21/62; H04L 63/101; H04L 63/102
See application file for complete search history.

(56) References Cited

U.S. PATENT DOCUMENTS 7,587,718 B1 9/2009 Mincarelli et al.
8,059,530 B1 11/2011 Cole
(Continued)

OTHER PUBLICATIONS

M. Upmanyu et al. Blind Authentication: A Secure Crypto-Biometric Verification Protocol. IEEE Transactions on Information Forensics and Security, vol. 5, No. 2. Jun. 2010. pp. 255-268. (Year: 2010).*

*Primary Examiner* — Robert B Leung
(74) *Attorney, Agent, or Firm* — Banner & Witcoff, Ltd.; Michael A. Springs

(57) ABSTRACT

Systems and methods are provided for monitoring access of computing resources. Usage rules may be created and stored that define a usage constraint based on actions available to be performed at the computing resources. An authenticator may verify login credentials received from a user and authorize the user to access a computing resource. A request to perform an action at the computing resource may be received, and a usage monitor may apply a usage rule to the requested action. If the requested action violates the usage constraint of the usage rule, the usage monitor may halt performance of the requested action and notify another user of the usage constraint violation. The authenticator may receive and verify another set of login credentials from that other user. In response to successful verification of the additional set of login credentials, the usage monitor may resume performance of the requested action.

20 Claims, 7 Drawing Sheets

Related U.S. Application Data continuation of application No. 14/483,589, filed on Sep. 11, 2014, now Pat. No. 9,298,899.

(51) Int. Cl.
*H04L 29/06* (2006.01)
*G06F 21/40* (2013.01)

(52) U.S. Cl.
CPC ........ *G06F 21/6218* (2013.01); *H04L 63/101* (2013.01); *H04L 63/102* (2013.01); *H04L 63/083* (2013.01); *H04L 63/108* (2013.01); *H04L 63/1425* (2013.01)

(56) References Cited

U.S. PATENT DOCUMENTS

| | | | |
|---|---|---|---|
| 8,490,163 | B1 | 7/2013 | Harsell et al. |
| 8,499,152 | B1 | 7/2013 | Chen et al. |
| 2001/0007133 | A1 | 7/2001 | Moriconi et al. |
| 2002/0091937 | A1* | 7/2002 | Ortiz .................. H04L 63/0861 726/5 |
| 2003/0061233 | A1 | 3/2003 | Manasse et al. |
| 2003/0101355 | A1 | 5/2003 | Mattsson |
| 2005/0060537 | A1 | 3/2005 | Stamos et al. |
| 2005/0071642 | A1 | 3/2005 | Moghe et al. |
| 2006/0112278 | A1* | 5/2006 | Cohen .................. G06F 21/121 713/186 |
| 2008/0120688 | A1 | 5/2008 | Qiu et al. |
| 2009/0144545 | A1 | 6/2009 | Dhuvur et al. |
| 2010/0192201 | A1 | 7/2010 | Shimoni et al. |
| 2010/0202669 | A1* | 8/2010 | Hollingsworth ... G06K 9/00617 382/117 |
| 2011/0055913 | A1* | 3/2011 | Wong ..................... H04L 63/08 726/9 |
| 2011/0093939 | A1 | 4/2011 | Barbour et al. |
| 2011/0184860 | A1 | 7/2011 | Bishop |
| 2011/0277019 | A1 | 11/2011 | Pritchard, Jr. |
| 2013/0086261 | A1 | 4/2013 | Lim |
| 2013/0247165 | A1 | 9/2013 | Pal |
| 2015/0082033 | A1* | 3/2015 | Bruce ...................... G06F 9/54 713/168 |
| 2015/0095987 | A1 | 4/2015 | Potash et al. |
| 2015/0106888 | A1 | 4/2015 | Cheng et al. |

* cited by examiner

AUTHENTICATING USERS REQUESTING ACCESS TO COMPUTING RESOURCES

CROSS-REFERENCE TO RELATED APPLICATIONS

This application is a continuation of U.S. patent application Ser. No. 15/048,283 entitled "Continuous Monitoring of Access of Computing Resources" and filed on Feb. 19, 2016, which is a continuation of U.S. patent application Ser. No. 14/483,589 entitled "Continuous Monitoring of Access of Computing Resources" and filed on Sep. 11, 2014, which issued as U.S. Pat. No. 9,289,899 on Mar. 29, 2016, each of which is incorporated by reference herein in its entirety.

BACKGROUND

Efforts to secure computing resources often focus on preventing unauthorized users from obtaining access to the computing resources of a computing system. Recent events have shown, however, that users authorized to access computing resources may abuse such authorization to the detriment of personal, financial, and national interests.

Current approaches to computer security might not be equipped to detect when a user that is authorized to access a computing resource abuses that authorization. Therefore there is a need for improved approaches to computer security that can detect, notify, and prevent potential abuses of authorized access to computing resources.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

A first aspect described herein provides a computer-implemented method of monitoring access of computing resources. A set of login credentials may be received from a user, and that user may be authorized to access a computing resource based on those login credentials. Actions the user requests to be performed at the computing resource may be monitored, and it may be determined whether or not those actions violate a usage constraint. If one of the actions does violate a usage constraint, performance of the action may be halted until another user authorizes the action.

A second aspect described herein provides a system for monitoring access of computing resources. A memory may store usage rules that each define a usage constraint. An authenticator may be configured to authenticate a user and authorizes that user to access a computing resources based on a set of login credentials received from the user. A usage monitor may be configured to apply one or more of the usage rules to the actions the user requests to be performed at the computing resource. The usage monitor may also be configured to determine that one of the actions violates the usage constraint of one of the usage rules and halt performance of that action until another user authorizes the action.

A third aspect described herein provides another computer-implemented method of monitoring access of computing resources. Usage rules may be stored at a memory. Each usage rule may define a usage constraint based on one or more of the actions available to be performed at the computing resources. An authenticator may receive a set of login credentials from a user. The authenticator may verify the login credentials and authorize the user to access one of the computing resources based on the verified login credentials. A request to perform an action at the computing resource may also be received from the user. A usage monitor may apply one or more of the usage rules to the requested action and determine that the requested action violates the usage constraint of one of the usage rules. The usage monitor may, in turn, halt performed of the requested action and notify another user that the requested action violates the usage constraint of one of the usage rules. The notification may identify the user that requested performance of the action, that action requested to be performed, the usage constraint violated by the action, and the usage rule that defines the usage constraint violated. The authenticator may receive and verify another set of login credentials from that other user. In response to successful verification of the additional set of login credentials, the usage monitor may resume performance of the requested action.

The details of these and other embodiments of the disclosure are set forth in the accompanying drawings and description below. Other features and advantages of aspects of the disclosure will be apparent from the description, drawings, and claims.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated with the benefit of this disclosure that one or more components illustrated in the accompanying figures may be positioned in other than the disclosed arrangement and that one or more of the components illustrated may be optional.

DETAILED DESCRIPTION

Figure 1:
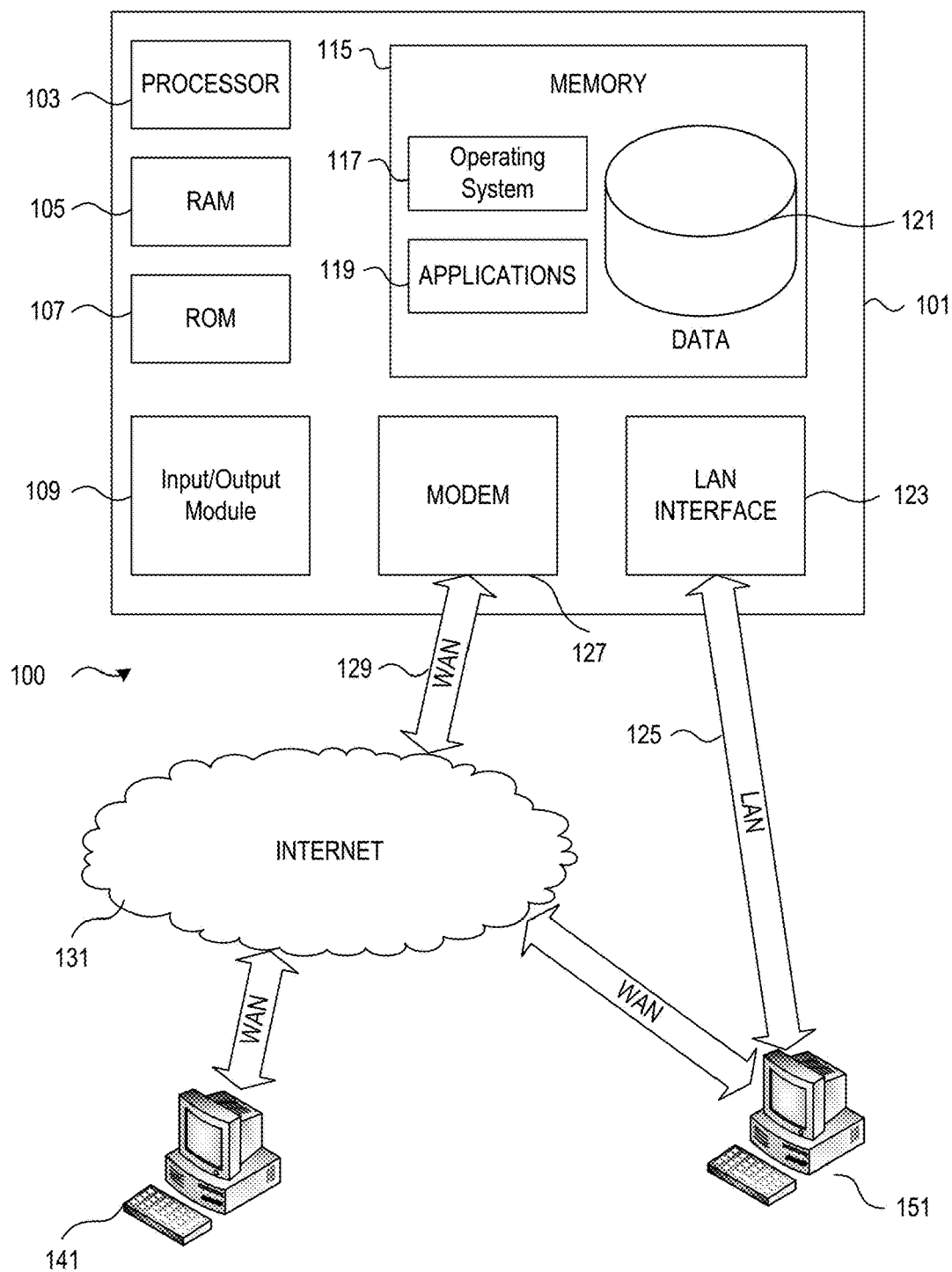
FIG. 1 is an illustrative operating environment in which various aspects of the disclosure may be implemented.

In accordance with various aspects of the disclosure, systems and methods are disclosed for monitoring access of computing resources of a computing system. After a user is authorized to access a computing resource, the actions the user requests to be performed at that computing resource are continuously monitored to determine whether such actions violate a usage constraint defined for the computing resource. If the requested action violates the usage constraint, then the requested action is halted, and a supervisor is notified of the usage constraint violation. The supervisor may be, for example, a computer system administrator or an employee supervisor. The supervisor may then review the usage violation and determine whether to permit performance of the requested action. If the supervisor authorizes performance of the requested action, then the action may resume and be performed at the computing resource.

The usage constraints thus allow an enterprise to define thresholds for what is considered to be typical use of the computing resources of its computing systems. By halting actions and notifying supervisors of usage constraint violations, that enterprise may advantageously ensure that users do not abuse their authorization to access those computing resources. Furthermore since the activity may resume upon authorization from a supervisor, the user experience is not significantly impacted. Access to the computing resource is only halted when use of that resource violates a usage constraint. If use of a computing resource remains within the boundaries of the usage constraint, access to that computing resource will be maintained. The supplemental authorization process thus advantageously serves as a check on the authorized use of a computing resource by allowing another individual to assess whether a user should be permitted to perform an action that exceeds typical use of a computing resource. In this way potential abuses of authorized access to computing resources may be advantageously detected and avoided. Additional benefits will be appreciated upon review of the additional disclosures set forth in further detail below.

As used in this disclosure, a computing resource refers to the hardware, software, and data elements of a computing system. Computing resources, as used in this description, include both physical and virtual resources. Physical resources include hardware such as, for example, mainframes, servers, routers, switches, disk arrays, workstations, desktop computing devices, laptop computing devices, tablet computing devices, palmtop computing devices, printers, scanners, communication devices, and the like. Virtual computing resources include software and data elements such as, for example, services, native and virtualized software applications, computer files, databases, and the like. Computing resources may also include interactive voice response (IVR) telephone systems as well as telephone systems where menu items may be selected using dual-tone multi-frequency (DTMF) signaling.

Furthermore "continuous" access monitoring, as used in this description, refers to comparing at least some of the actions a user requests to be performed at a computing resource during a user session to one or more of the usage rules defined for a computing system. While some example implementations may compare each action a user requests to be performed to the usage rules, other implementations that compare some, but not all, of the actions a user requests to be performed still fall within the scope of continuous access monitoring of a computing resource.

It is also to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition, "set" as used in this description refers to a collection that may include one element or more than one element.

Moreover, aspects of the disclosure may be implemented in non-transitory computer-readable media having instructions stored thereon that, when executed by a processor, cause the processor to perform various steps described in further detail below. As used in this description, non-transitory computer-readable media refers to all computer-readable media with the sole exception being a transitory propagating signal. The instructions may be organized into one or more program modules that may be executed by one or more computers or other devices as described herein. Program modules may include routines, programs, objects, components, data structures, and the like that perform particular tasks or implement particular data types when executed by a processor in a computer or other device. The modules may be written in a source code programming language that is subsequently compiled for execution, or may be written in a scripting language that supports scripts interpreted in a run-time environment. The instructions may be stored on a computer-readable medium as described in further detail below. Accordingly aspects of the disclosure may be embodied as a method, data processing system, or computer program product. Functionality described below may therefore be embodied at least in part in software, firmware, or hardware such as integrated circuits, field programmable gate arrays (FPGA), and the like. Furthermore data structures that implement aspects of the disclosure are considered to be within the scope of the computer-readable instructions.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational within a special purpose computing systems and environments configured to authenticate and authorize users to access computing resources as well as continuously monitor such access to those computing resources. These special purpose computing systems and environments may include personal computers (PCs), server computers, hand-held or laptop devices, multiprocessor systems, microprocessor-based systems, programmable consumer electronics, network PCs, minicomputers, mainframe computers, distributed computing environments that include any of the systems or devices listed above, and the like. These special purpose computing systems may be configured to perform, execute, or otherwise carryout aspects of the disclosure described in further detail below.

With reference to FIG. 1, the computing system environment 100 may include a continuous access monitoring server 101 at which aspects of the disclosure may be implemented. The continuous access monitoring server 101 may have a processor 103 for controlling the its overall operation and its associated components which may include random-access memory (RAM) 105, read-only memory (ROM) 107, a communications module 109, and memory 115. The processor 103 and its associated components may allow the continuous access monitoring server 101 to run a series of computer-readable instructions related to authenticating users based on login credentials received, authorizing users to access a computing resource based on those login credentials, and continuously monitor access of that computing resource during a user session.

The continuous access monitoring server 101 may include a variety of computer-readable media. The computer-readable media may be any available non-transitory media that may be accessed by the continuous access monitoring server 101 and may include both volatile and non-volatile media as well as removable and non-removable media.

Computer storage media include volatile and non-volatile, removable and non-removable media implemented in any method or technology for storage of information such as computer-readable instructions, data structures, program modules, or other data. Computer storage media include, but are not limited to, random access memory (RAM), read-only memory (ROM), electronically erasable programmable read only memory (EEPROM), flash memory or other memory technology, CD-ROM discs, digital versatile discs (DVD), or other optical disk storage, magnetic cassettes, magnetic tape, magnetic disk storage or other magnetic storage devices, or any other non-transitory medium that can be used to store the desired information that can be accessed by the continuous access monitoring server 101.

The computing system environment 100 may also include optical scanners (not shown). Example uses of the optical scanners include scanning and converting paper documents, such as correspondence, data, and the like to digital files.

Although not shown, RAM 105 may include one or more applications representing the application data stored in RAM 105 while the continuous access monitoring server 101 is running and while corresponding software applications (e.g., software tasks) are executing on the continuous access monitoring server 101.

The communications module 109 may include a microphone, keypad, touch screen, stylus, or other types of input devices through which a user of the continuous access monitoring server 101 may provide input, and may also include one or more of a speaker for providing audio output and a video display device for providing textual, audiovisual, and/or graphical output.

Software may be stored within memory 115 and/or a storage device or storage media to provide instructions to the processor 103 that enable the continuous access monitoring server 101 to perform various functions. For example, memory 115 may store software used by the continuous access monitoring server 101, such as an operating system 117, application programs 119, and an associated database 121. In certain aspects, the continuous access monitoring server 101 may comprise a plurality of databases 121. Also, some or all of the computer executable instructions for the continuous access monitoring server 101 may be embodied in hardware or firmware.

The continuous access monitoring server 101 may operate in a networked environment supporting connections to one or more remote computing devices, such as computing devices 141 and 151. The computing devices 141 and 151 may be personal computing devices or servers that include many or all of the elements described above relative to the continuous access monitoring server 101.

The network connections depicted in FIG. 1 may include a local area network (LAN) 125 and a wide area network (WAN) 129, but may also include other types of networks. When used in a LAN networking environment, the continuous access monitoring server 101 may be connected to the LAN 125 through a network interface or adapter in the communications module 109. When used in a WAN networking environment, the continuous access monitoring server 101 may include a modem in the communications module 109 or other means for establishing communications over the WAN 129, which may include the Internet 131 or other type of wide-area computer network. It will be appreciated that the network connections shown are illustrative and other means of establishing a communications link between the computing devices may be used. Various well-known protocols such as TCP/IP, Ethernet, FTP, HTTP, and the like may be used. The continuous access monitoring server 101 may be operated in a client-server configuration to permit a user to retrieve web pages from a web-based server. Any of various conventional web browsers may be used to display and manipulate web pages.

Additionally, one or more application programs 119 used by the continuous access monitoring server 101, according to an illustrative embodiment, may include computer-executable instructions for invoking functionality related to communication including, for example, email, short message service (SMS), and voice input and speech recognition applications. In addition, the application programs 119 may include computer-executable instructions for invoking user functionality related to access a centralized repository for performing various service tasks like routing, logging, data storage, and protocol bridging. Application programs 119 of the continuous access monitoring server 101 may also include authentication programs, authorization programs, usage monitoring programs, and other types of programs that will be appreciated with the benefit of this disclosure.

Embodiments of the disclosure may include forms of computer-readable media. Computer-readable media include any non-transitory media that can be accessed by the continuous access monitoring server 101. Storage media include volatile and nonvolatile, removable and non-removable media implemented in any method or technology for storage of information such as computer-readable instructions, object code, data structures, program modules, or other data.

Figure 2:
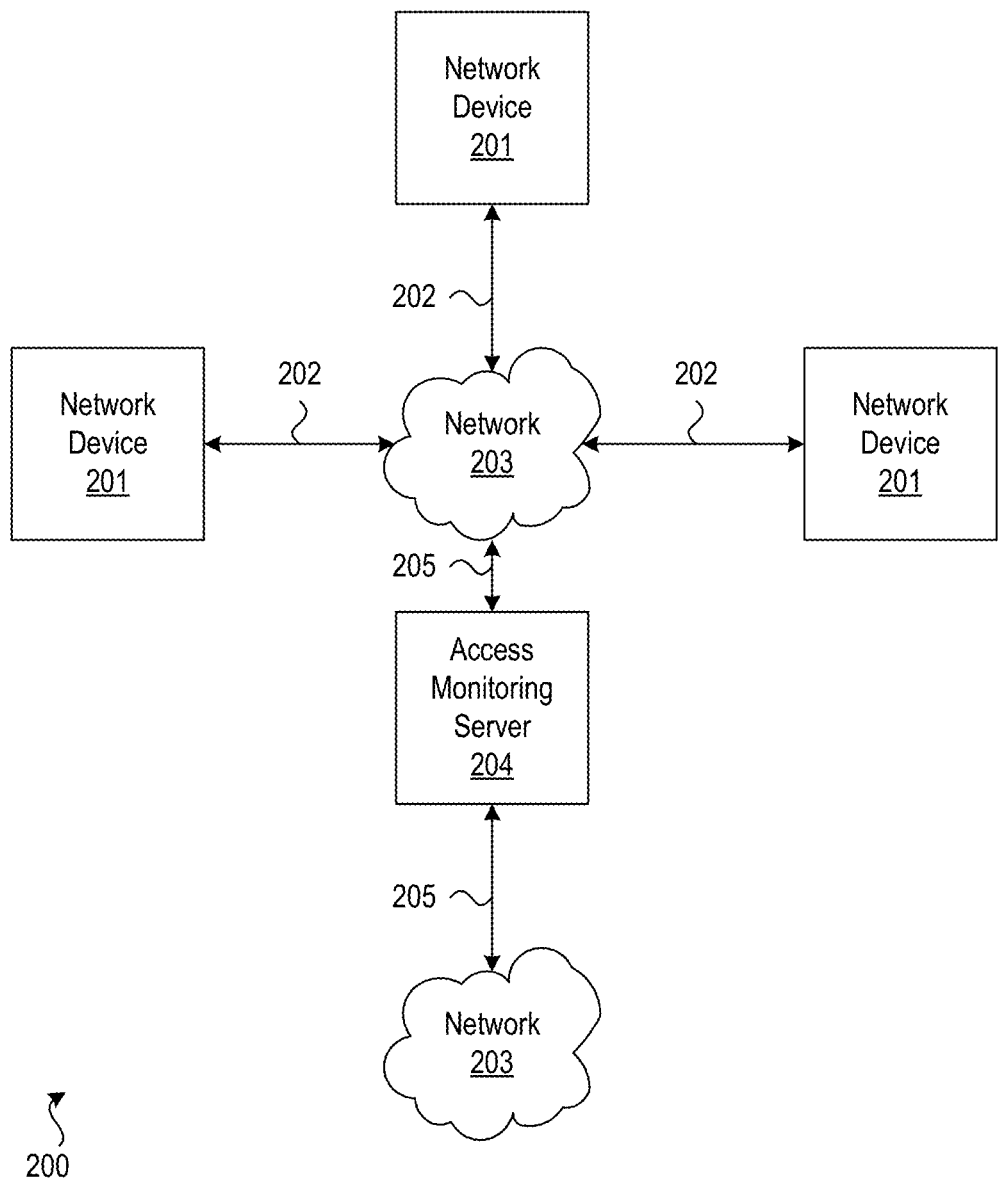
FIG. 2 is a block diagram of an example of an implementation of a continuous access monitoring system.

Referring now to FIG. 2, a block diagram of an example of an implementation of a continuous access monitoring system 200 is shown. As illustrated, the continuous access monitoring system 200 may include one or more network devices 201 which may, in some examples, be connected by one or more communications links 202 to computer network 203. The computer network 203 may in turn be linked via communications links 205 to a continuous access monitoring server 204. In the continuous access monitoring system 200, the continuous access monitoring server 204 may be any suitable server, processor, computer, or data processing device, or combination of the same. In some example implementations the continuous access monitoring server 204 of FIG. 2 may be the same as or at least similar to the continuous access monitoring server 101 described above with reference to FIG. 1. The continuous access monitoring server 204 may be used to process input received from a user or one or more of the network devices 201.

According to one or more aspects, the continuous access monitoring system 200 may be associated with the computing system of an enterprise. In some instances, the enterprise may be, for example, a financial institution such as a bank. Although it will be appreciated that the enterprise may be one of many other types of entities that maintain enterprise-wide computing systems and monitoring access to their respective computing resources.

The computer network 203 may be any suitable computer network including the Internet, an intranet, a wide-area network (WAN), a local-area network (LAN), a wireless network, a digital subscriber line (DSL) network, a frame relay network, and asynchronous transfer mode network, a virtual private network (VPN), or any combination of any of the same. The communications links 202 and 205 may be any communications links suitable for communicating between the network devices 201 and the continuous access monitoring server 204, such as network links, dial-up links, wireless links, hard-wired links, and the like.

Having described examples of computing devices that may be used to implement various aspects of the disclosure and an operating environment in which various aspects of the disclosure may be implemented, various embodiments are discussed in greater detail below.

Figure 3:
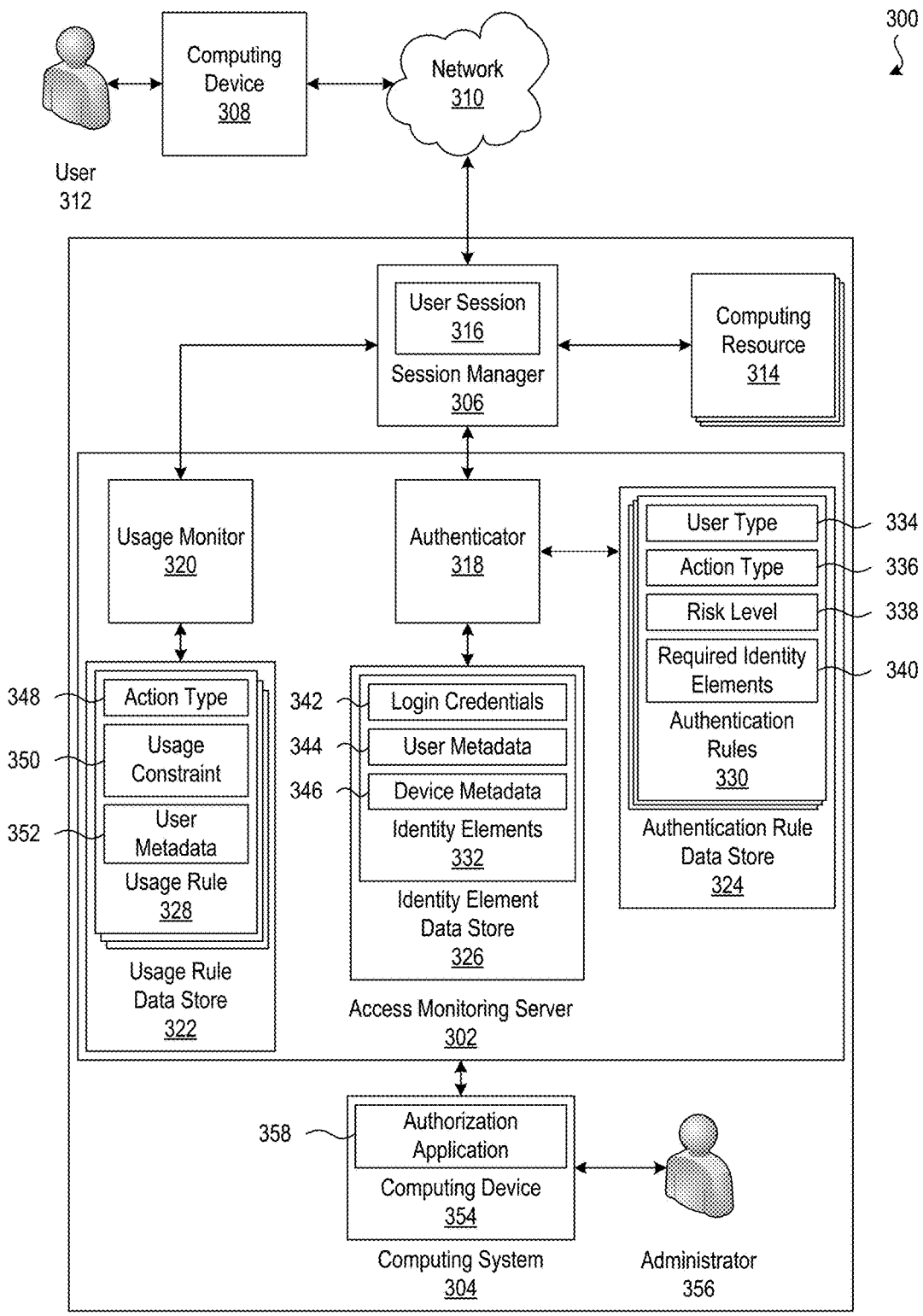
FIG. 3 is a block diagram of another example of an implementation of a continuous access monitoring system.

In FIG. 3, a block diagram of a detailed view of an example of an implementation of a continuous access monitoring system 300 is shown. The continuous access monitoring system 300 may be similar to the continuous access monitoring system 200 of FIG. 2. The continuous access monitoring system 300 may similarly include a continuous access monitoring server 302, which may be the same as or at least similar to the continuous access monitoring server 204 of FIG. 2 and the continuous access monitoring server 101 of FIG. 1. As seen in FIG. 3, the continuous access monitoring server 302 may be part of a larger computing system 304 such as the enterprise-wide computing system maintained by an enterprise. As also seen in FIG. 3, the continuous access monitoring server 302, in this example, is in signal communication with a session manager 306 which is in turn in signal communication with an end-user computing device 308 via a network 310. The end-user computing device 308 may be, for example, a workstation operated by a user 312. The user 312 may utilize the computing device 308 to access one of the computing resources 314 of the computing system 304. The user 312 may be internal (i.e., an internal user) to the enterprise that maintains the computing system such as, for example, an employee of the enterprise. The user 312 may additionally or alternatively be external (i.e., an external user) to the enterprise that maintains the computing system such as, for example, a customer of the enterprise.

The session manager 306, in this example, is configured to create and maintain a user session 316 to facilitate access to the computing resource 314. The continuous access monitoring server 302, in this example, is in signal communication with the session manager 306 to facilitate monitoring user access of the computing resource 314. Upon receipt of a request to access a computing resource 314, the session manager 306 may create a new user session 316 for the user 312 that submitted the request. The request may include or be followed by receipt of login credentials associated with the user 312. If the login credentials are successfully verified (i.e., authenticated), then the user 312 may be granted access to the computing resource 314 (i.e., authorized to access the computing resource). During the user session 316, the session manager 306 may also receive requests to perform an action at the computing resource 314 and facilitate performance of the requested action. The session manager 306 may also facilitate logging or otherwise keeping track of the actions requested to be performed at the computing resource 314 including, for example, the type of action requested, the date and time the action was requested, and the target computing resource.

Some examples of the various types of actions that may be requested and performed include: invoking a function of a service such as a web service; invoking a remote procedure call; requesting and receiving a web page; uploading and downloading computer files; creating, deleting, and modifying computer files; creating, deleting, and modifying database records; and the like. In financial contexts, a financial institution (e.g., a bank) may maintain a computing system that provides access to customer financial accounts via a web server and mobile server. The web server and mobile server may be configured to respectively provide web-based and mobile-based interfaces for managing the customer financial accounts. Actions customers may request, in this example, may include viewing account balances, creating bill payees, transferring money between accounts, and the like. Users may request additional and alternative types of actions in additional and alternative contexts.

As seen in FIG. 3, the continuous access monitoring server 302, in this example, is in signal communication with the session manager 306 to monitor the actions the user 312 requests to be performed during the user session. The continuous access monitoring server 302, in this example, includes an authenticator 318, a usage monitor 320, a usage rule data store 322, an authentication rule data store 324, and a identity element data store 326. The usage rule data store 322 may store a set of usage rules 328; the authentication rule data store 324 may store a set of authentication rules 330; and the identity element data store 326 may store a set of identity elements 332 for multiple users. Although three data stores 322-326 are shown by way of example in FIG. 3, other implementations of the access monitoring server may store the usage rules 328, authentication rules 330, and identity elements 332 in a single data store.

The authenticator 318 of the continuous access monitoring server 302 may be in signal communication with the session manager 306 and facilitate authentication of the user 312. As noted above, the user 312 may submit, via an application at the computing device 308, a request to access a computing resource 314 of the computing system 304 which may include a set of login credentials (e.g., username and password). The application at the computing device 308 may be, for example, a web browser, a desktop application, a mobile application, and the like. The session manager 306 may receive the access request and forward the login credentials to the authenticator 318 for verification (e.g., in an authentication request). As described in further detail below, the authenticator 318, in this example, may be configured to determine if the login credentials received are sufficient to authenticate the user 312. If the login credentials are sufficient to authenticate the user, then the authenticator 318 may determine whether the login credentials are valid and inform the session manager 306 (e.g., in an authentication response). If the authenticator 318 verifies the login credentials received, the session manager 306 may permit the user 312 to access the target computing resource 314. If the authenticator 318 cannot verify the login credentials received, then the session manager 306 may deny the user 312 access to the target computing resource 314. Computer system administrators or security administrators may determine what sets of identity elements are sufficient to authenticate a user in various circumstances according to the level of security desired for a computing system or an individual computing resource.

In addition, if the authenticator 318 determines that the login credentials received are not sufficient to authenticate the user 312, then the session manager 306 may inform the application at the computing device 308 that additional authentication must be performed before the user 312 is permitted to perform the requested action. The application may be configured to obtain additional authentication procedures in response to receipt of a notification indicating that additional authentication is needed, e.g., by initiating two-factor authentication using a one-time password (OTP). The authenticator 318, in this example, determines whether the login credentials received are sufficient to authenticate the user 312 based on the authentication rules 330 stored at the authentication rule data store 324.

Security administrators of the enterprise that maintains the computing system 304 may create and configure the authentication rules 330. The authentication rules 330 may include various attributes such as a user type 334, an action type 336, a risk level 338 for the action type, and a set of required identity elements 340 for the action type. Security administrators may perform a risk analysis of the actions available to be performed at the computing resources 314 of the computing system 304 and assign a corresponding risk level to each action. The risk level may depend on one or more of the type of action and the type of user requesting the action. Some actions, for example, may be relatively more or less risky depending on the type of user requesting performance of that action (e.g., internal users vs. external users). Some actions may additionally or alternatively be relatively more or less risky depending on the type of action. In the financial context, for example, simply viewing an account balance may be considered to be relatively less risky than performing a money transfer. Security administrators may thus configure the authentication rules to require more or fewer identity elements based on the risk level. For example, one authentication rule may require only a username and password for an action having a relatively lower risk level while another authentication rule may require a username, password, and OTP for an action having a relatively higher risk level. The set of required identity elements 340 may further depend on additional and alternative criteria including, e.g., a day of the week, a time of day, a geographic location of the user 312, a location of the computing device 308 and so forth. The authentication rule data store 324 may store the authentication rules 330 as, for example, individual records in a database. The user type 334, action type 336, risk level 338, and required identity elements 340 may thus correspond to tables or table columns of the database.

When the authenticator 318 receives a request to access a computing resource 314 or perform an action at the computing resource, the authenticator may retrieve the appropriate authentication rule 330 from the authentication rule data store 324. The access request received may include the user type of the user 312 (e.g., customer, employee), the requested action type (e.g., view account profile, create payee, transfer money, download file, delete file), and one or more identity elements. Having retrieved the appropriate authentication rule 330, the authenticator 318 may compare the required identity elements 340 defined by the authentication rule to the identity elements received in the access request. If the received identity elements include the required identity elements 340, then the authenticator 318 verifies the received identity elements.

To verify the received identity elements, the authenticator 318 compares them to the identity elements 332 stored at the identity element data store 326 for the user. As seen in FIG. 3, the identity elements 332 may include login credentials 342, user metadata 344, and device metadata 346. The identity elements 332 may correspond to information associated with the user 312, e.g., something the user is, something the user has, something the user does, and something the user knows. Accordingly user metadata 344 may include, for example, service identifiers, ownership credentials, user location, user domain, user job title, user job code, position access code, security clearance level, identity proofing, employment type, preferred working hours, user certificates, user training, and the like. Device metadata 346 may include, for example, device type, device location, IP address (Internet Protocol), MAC address (Machine Access Control), OS type (operating system), OS version, multifactor capabilities, application type, application version, and the like. The authentication process will be discussed in further detail below.

As also seen in FIG. 3, the usage monitor 320, in this example, is also is signal communication with the session manager 306. The usage monitor 320 is configured to continuously monitor the actions the user 312 requests to be performed at the computing resource 314. The usage monitor 320 is also in signal communication with the usage rule data store 322. Upon receipt of a request to perform an action at the computing resource 314, the session manager 306 may notify the usage monitor 320. The usage monitor 320 may then retrieve one or more usage rules 328 from the usage rule data store 322. The usage rules 328 may identify an action type 348 and a usage constraint 350 for that action type. Security administrators may create and configure the usage rules 328 such that the usage constraint 350 corresponds to a threshold of what is considered to be typical use of the computing resource 314. Since typical use of a computing resource 314 might depend on the type of user accessing the resource, a usage rule 328 may also define user metadata 352 for the usage rule. Usage rules 328 may include additional or alternative user metadata which will be appreciated with the benefit of this disclosure. The notification the usage monitor 320 receives from the session manager 306 may identify the action type and various user metadata for comparison to the action type 348 and user metadata 352 of one or more of the usage rules 328.

The usage constraint 350 of a usage rule 328 may be based on various metrics associated with the actions the user 312 requests to be performed. One usage rule, for example, may define a usage constraint that is based on a frequency with which a type of action is performed. Security administrators may determine, for example, that users typically invoke a service an average of five times an hour and thus determine that invocation of the service more than ten times an hour constitutes a potential abuse of that service. The security administrators may thus create a usage rule for that service and configure the usage constraint such that the usage rule is violated if a user invokes the service more than ten times an hour, i.e., exceeds a usage threshold of ten times per hour. Another example usage rule may define a usage constraint that is based on a total number of computer files requested to be retrieved. Security administrators may determine, for example, that users typically retrieve an average of 25 computer files from a particular computing resource 314 per day and thus determine that requesting more than 50 computer files per day from that computing resource constitutes a potential abuse of that computing resource. The security administrators may thus create a usage rule for that computing resource 314 and configure the usage constraint such that the usage rule is violated if a user requests retrieval of more than 50 computer files from the computing resource 314 within a 24 hour period. A similar a usage rule may be created with a usage constraint that is based on a total number of database queries the user requests to be performed within a predetermined time period.

Other examples of usage rules are provided below. An example usage rule may define a usage constraint that is based on a day of the week or time of day an action is requested to be performed. Security administrators may thus configure the usage constraint of a usage rule such that the usage rule is violated when a user requests an action to be performed outside of typical working hours (e.g., 9:00

AM-5:00 PM) or outside of the typical working hours observed for that user and saved, e.g., as user metadata 352 at the identity element data store. Similarly security administrators may configure the usage constraint of a usage rule such that the usage rule is violated when a user requests an action to be performed outside of typical workdays (e.g., Monday through Friday) or outside of the preferred days the user is observed to work which may also be stored as user metadata 352. An example usage rule may define a usage constraint that is based on a geographic location of the user. Security administrators may configure the usage constraint of the usage rule such that the usage rule is violated when a user requests access to the computing resource 314 from a new geographic location, i.e., a location the user has not yet been observed at before. The identity element data store 326 may store information identifying the geographic locations the user is observed at as user metadata 344. Similarly an example usage rule may define a usage constrain that is based on a location of the end-user computing device 308, e.g., internal or external to an intranet provided by the computing system 304. An example usage rule may define a usage constraint that is based on the computing device 308 the user utilizes to access the computing resource 314. Security administrators may configure the usage constraint of the usage rule such that the usage rule is violated when the user access the computing resource 314 from a new computing device, i.e., a computing device the user has not yet been observed as using. The identity element data store 326 may store information identifying the computing devices the user utilizes as user metadata 344.

In some example implementations, the usage rules 328 may include usage rules that define respective usage constraints that are based on the total number of supplemental authorizations performed by an individual. The usage rule may be configured such that the usage constraint is based on the total number of supplemental authorizations an individual performs overall or for a particular user. The usage constraint, in this example usage rule, may also be based on a percentage of requested actions approved by the individual, again either overall or for a particular user. For example, computer security administrators may determine that approving a total of x usage constraint violations or y % of usage constraint violations for a particular user constitutes a potential abuse of such approval. Accordingly a usage rule may be created with a usage constraint that defines an approval threshold. If an administrator exceeds the approval threshold, then approval from another administrator (e.g., a super-administrator), may be required before approval of a usage constraint violation may be completed. In this way, the continuous access monitoring system may advantageously prevent a user from colluding with an individual that has the ability to approve usage constraint violations.

A usage rule 328 may be applicable to one or more of the computing resources 314 of the computing system 304. Accordingly a usage rule 328 may also include an attribute that indicates which computing resource 314 or computing resources the usage rule is applicable to. The usage rule 328 may identify a particular computing resource 314 (e.g., by a unique identifier or address) or a set of computing resources (e.g., by domain, type, location). Security administrators may, for example, create and configure a usage rule 328 that applies to each server of the computing system 304, each web server of the computing system, each database of the computing system, and so forth. Security administrators may also create a usage rule that applies to each computing resource associated with a particular business unit of an enterprise, located within a particular geographic boundary, addressed to a particular subnet of the computing system, and so forth. Security administrators may also individually select the computing resources 314 a usage rule 328 applies to. Additional and alternative examples will be appreciated with the benefit of this disclosure.

The notification of the access request received at the usage monitor 320 from the session manager 306 may thus include information used to compare the access request to the usage rules 328. The notification may, for example, identify the user, the type of user, the location of the user, the type of end-user computing device, the type of action requested to be performed, and so forth. As noted above, the usage monitor 320 may determine whether an access request violates a usage rule 328 by comparing the access request to previous actions performed for the user. The notification received at the usage monitor 320 from the session manager 306 may thus also include information describing those previous actions, e.g., the total number of times a type of action has previously been performed for the user.

As noted above, supplemental authorization from another individual may be required when a requested action violates the usage constraint of one of the usage rules. In response to violation of a usage constraint 350, the usage monitor 320 may instruct the session manager 306 to halt the action the user 312 has requested to be performed at the computing resource 314. The usage monitor 320 may also notify another individual (e.g., a supervisor or administrator) that may authorize the action. The notification may, for example, identify for that individual the user that requested the action, various user metadata associated with the user, that action the user requested to be performed, the computing resource 314 accessed, the usage constraint 350 violated by the requested action, the usage rule 328 that defines the usage constraint violated, information describing previous actions performed for the user, and so forth. The individual may review the violation notification and determine whether the user should be permitted to have the requested action performed at the computing resource 314. The individual may authorize the requested action by, for example, logging into the continuous access monitoring server 302 with assigned login credentials (e.g., username and password). Upon verification of the access credentials received, the usage monitor 320 may instruct the session manager 306 to resume performance of the action requested by the user 312.

The usage rules 328 may be modified as needed to adjust the usage constraint or other information associated with a usage rule. In this way, the continuous access monitoring server may be adaptable to changes in the usage patterns observed by an enterprise. For example, if an enterprise determines that a relatively large volume of requested actions are being halted for supplemental authorization, the usage constraints of the usage rules may be adjusted such that fewer requested actions result in usage constraint violations. The enterprise may likewise adjust the usage constraints if the enterprise determines that a relatively small volume of requested actions are being halted for supplemental authorization. In some example implementations, the continuous access monitoring system may automatically identify use patterns based on observed use of computing resources and dynamically adjust the usage constraints based on the use patterns observed.

As seen in FIG. 3, the continuous access monitoring server 302 is in signal communication with a computing device 354 operated by an administrator 356. The computing device 354, in this example, includes an authorization application 358 the administrator 356 may utilize to review, approve, or reject usage constraint violations. The continuous access monitoring server 302 may transmit the violation notification to the computing device 354 where the authorization application 358 may present it to the administrator 356. The violation notification may be for example, an email notification or a pop-up message notification and include the information described above by way of example. As shown by way of example in FIG. 3, the administrator computing device 354 is located remotely relative to the end-user computing device 308. Accordingly the authorization application 358 advantageously allows the administrator 356 to approve usage constraint violations even if the administrator is geographically separated from the location of the user 312. In other example implementations, however, the end-user computing device 308 may be equipped with an application, program, or module that receives the authorization from the administrator. In these alternative implementations, an administrator may authorize the requested action at the end-user computing device. It will thus be appreciated that the continuous access monitoring server 302 described above advantageously allows enterprises to define predetermined thresholds for abuse of authorized access to computing resources, determine when such potential abuse occurs, and halt requested actions until another individual can review and approve the activity. As a result, potential abuse of authorized access to computing resources is thereby advantageously reduced.

Figure 4A:
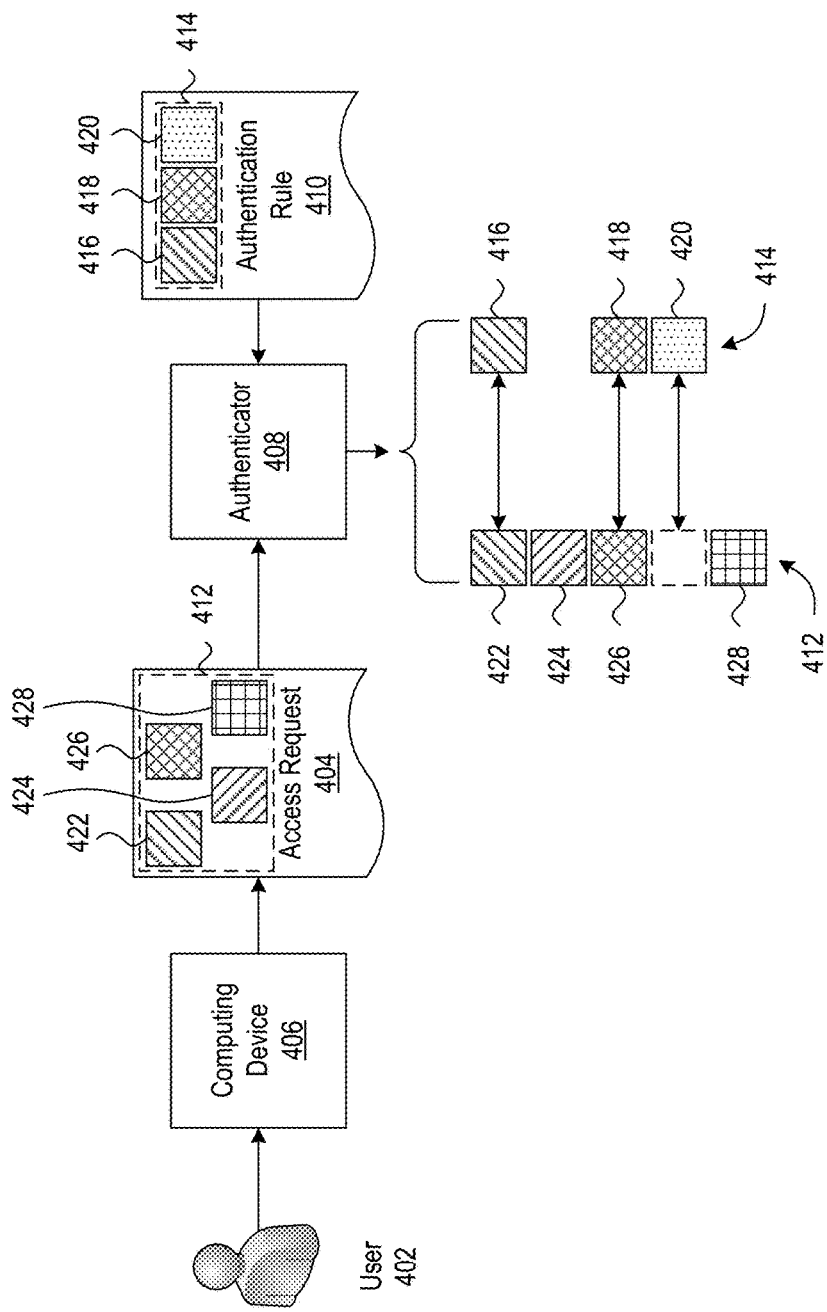
FIG. 4A is an example workflow of an authentication process in accordance with aspects of the disclosure.
Figure 4B:
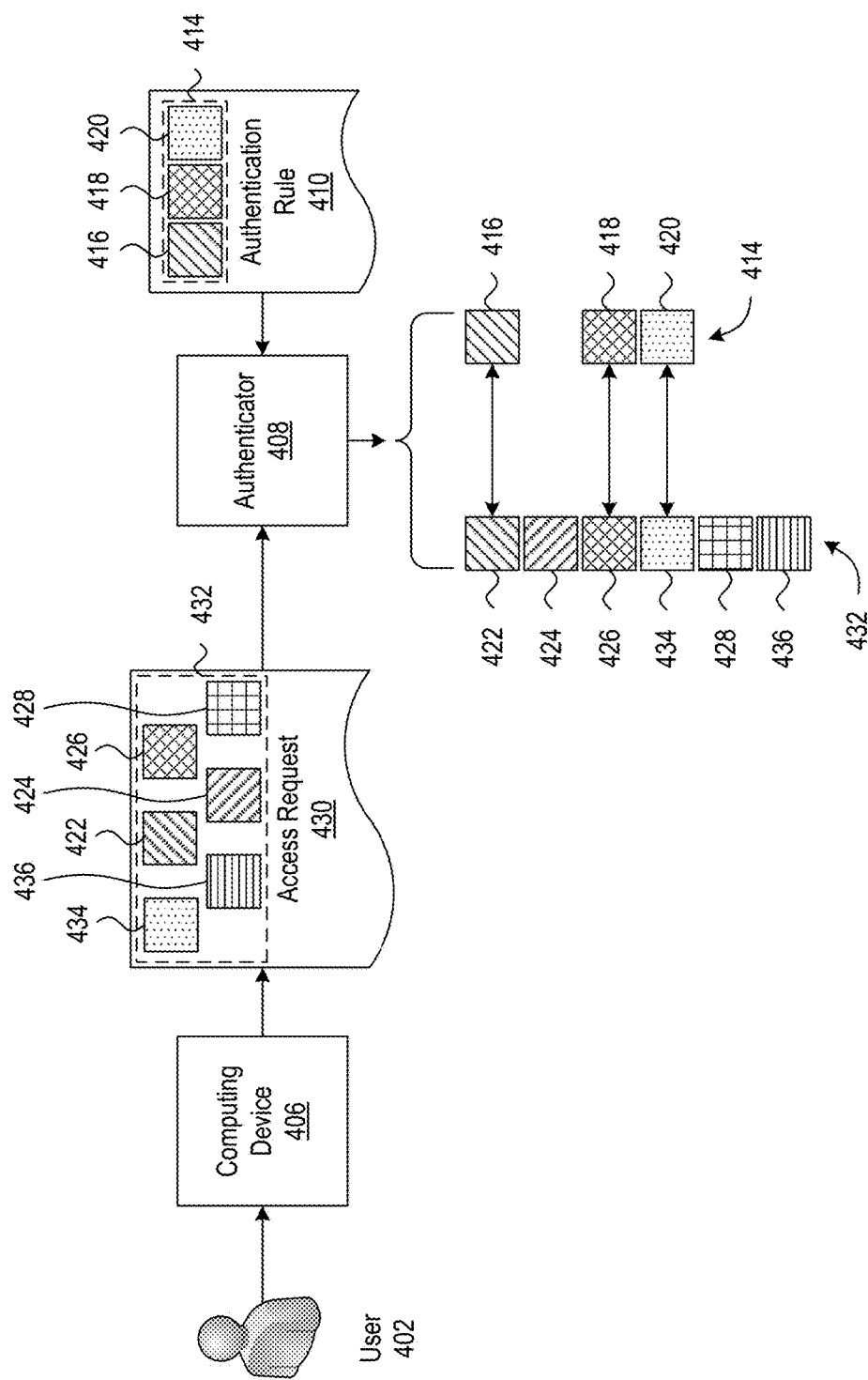
FIG. 4B is another example workflow of an authentication process in accordance with aspects of the disclosure.

Referring now to FIGS. 4A-B, workflows for an improved approach to authenticating users requesting access to computing resources is shown. This approach to authentication utilizes an authenticator that applies one or more authentication rules defined as described above. As seen in FIG. 4A, a user 402 may submit an access request 404 via a computing device 406 requesting access to a computing resource. The computing device 406 may be the same as or at least similar to the computing device 308 described above with reference to FIG. 3. An authenticator 408 may receive and process the access request 404. The authenticator 408 may likewise be the same as or at least similar to the authenticator 318 described above with reference to FIG. 3. The authenticator 408 may transmit a response back to the computing device 406 with one of three authentication results: authentication successful, authentication failed, or additional authentication required.

As also described above, the authenticator may determine whether additional authentication is required by applying an authentication rule 410 to the access request 404. As illustrated in FIG. 4A, the access request 404 includes a set of identity elements 412, and the authentication rule includes a set of required identity elements 414. In this approach to authentication, the computing device 406 (or corresponding application executing at the computing device) remains unaware of the identity elements required for successful authentication. The set of identity elements 412 received in the access request represent the identity elements known to the computing device 406 (or corresponding application), and the authenticator determines whether that set of identity elements is sufficient to authenticate the user based on the required identity elements indicated by the authentication rule 410. If sufficient to authenticate the user, the authenticator 408 verifies one or more of the identity elements received in the access request 404.

The set of identity elements 412 received in the access request 404 may include login credentials, user metadata, and device metadata as described above. The set of required identity elements 414 in the authentication rule 410 may likewise include a combination of login credentials, user metadata, and device metadata. As described above, the set of required identity elements 414 may be defined by security administrators and may be based on the type of action requested, the type of user making the request, the risk level associated with the action, and other types of criteria that will be appreciated with the benefit of this disclosure. As noted above, however, the set of required identity elements 414 is not shared with the computing device 406 to maintain the security of the computing system. Rather the access request 404 includes the set of identity elements 412 known to the computing device 406 (or application), and the authenticator determines whether those identity elements are sufficient to authenticate the user 402. The authenticator 408, however, does not inform the computing device (or application) which particular identity elements are required to authenticate the user 402, only that additional authentication is needed, i.e., additional identity elements. It is then the responsibility of the computing device 406 (or application) to obtain one or more additional identity elements such as, e.g., an OTP.

This aspect of the authentication process is illustrated by way of example in FIG. 4A. As seen in FIG. 4A, the set of required identity elements 414 of the authentication rule 410 include identity elements 416, 418, and 420. The set of identity elements 412 included in the access request 404 include identity elements 422, 424, 426, and 428. As seen in FIG. 4A, the identity elements 416-420 and 422-428 are distinguished via their shading patterns. To determine whether the received set of identity elements 412 is sufficient to authenticate the user 402, the authenticator 408 matches them to the set of required identity elements 414 of the authentication rule. As seen in FIG. 4A, the authenticator 408 determines that received data identity element 422 matches required data identity element 416 and that received data identity element 426 matches required data identity element 418. The received set of identity elements 412, however, does not include required data identity element 420. Accordingly the authenticator 408 may transmit a response to the computing device 406 indicating that the received set of identity elements 412 is not sufficient to authenticate the user 402. It will also be appreciated with reference to FIG. 4A that the authenticator 408 does not match each data identity element received in the access request 404 to a corresponding required identity element. Instead the authenticator 408 matches some subset of the received set of identity elements 412 to the set of required identity elements 414 defined by the authentication rule 410. The user 402, computing device 406, and application operating at the computing device, however, remains unaware of the particular subset of identity elements required to authenticate the user.

In response to receipt of a notification that the received set of identity elements 412 is not sufficient to authenticate the user 402, a new access request may be submitted with one or more additional identity elements. As seen in FIG. 4B, the computing device 406 may submit a new access request 430 with a new set of identity elements 432. The new set of identity elements 432, in this example, includes previously submitted identity elements 422-428 as well as additional identity elements 434 and 436. The authenticator 408 may again match the set of required identity elements 414 to a subset of the received set of identity elements 432. As seen in FIG. 4B, the set of received identity elements 432 includes identity elements that match each of the required identity elements in this example, i.e., the authenticator 408 may determine that required identity element 416 matches received identity element 422, required identity element 418 matches received identity element 426, and data identity element 420 (missing from the previous access request 404) matches identity element 434 included in the new access request 430. As a result, the authenticator 408 may determine that the received set of identity elements 432 included in the new access request 430 is sufficient to authenticate the user 402.

To further secure the authentication process, the identity elements required by an authentication rule may be dynamic. In particular the set of required identity elements may be randomized for each access request received. An authentication rule may define a pool of identity elements that may be used for authentication and a total number, x, of identity elements required for authentication. The authenticator may be configured to randomly select x number of required identity elements from the pool of identity elements defined for the authentication rule. The total number of identity elements required may also be randomized. The authentication rule may, for example, specify a range, x-y, of identity elements required for authentication, and the authenticator may be configured to randomly select a value between x and y as the number of identity elements to be selected as the set of required data elements. An authentication rule may also define multiple individual sets of identity elements which the authenticator 408 may select at random upon receipt of a request to access a computing resource. The randomized sets of identity elements and the randomly selected sets of identity elements may each represent a collection of identity elements sufficient to authenticate a user based on various criteria such as, e.g., action type, user type, risk level, and other types of criteria that will be appreciated with the benefit of this disclosure.

Figure 5:
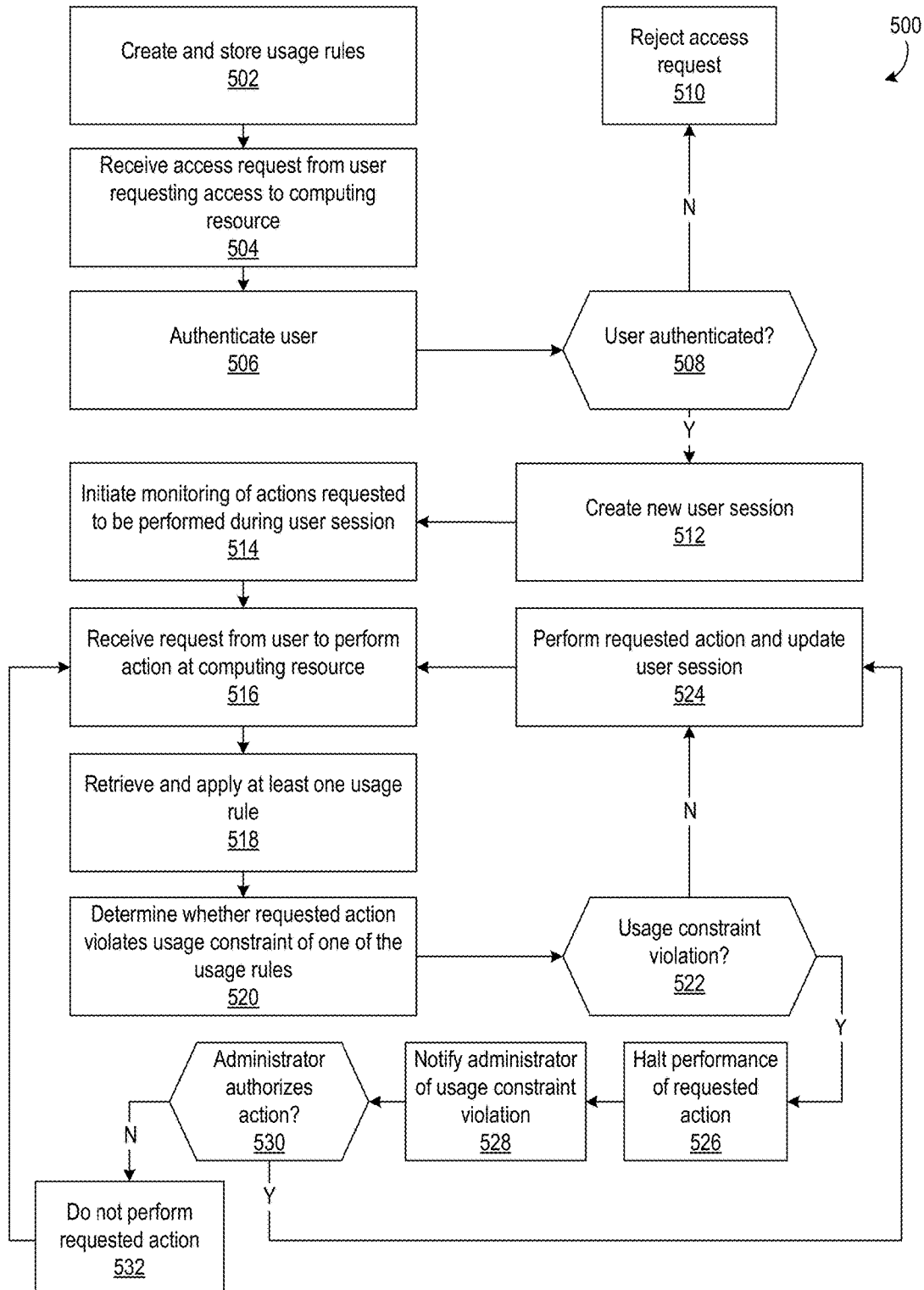
FIG. 5 is a flowchart of example method steps for monitoring access to a computing resource in accordance with aspects of the disclosure.

Referring now to FIG. 5, a flowchart 500 of example method steps for continuously monitoring access to a computing resource in accordance with aspects of this disclosure is shown. Usage rules each defining a respective usage constraint may be created and stored at a data store (block 502) as described above. Computer system administrators or security administrators may determine what kinds of authorized use of computing resources constitute an abuse of that authorization, identify a corresponding usage threshold, and configure a usage rule with a usage constraint based on that usage threshold as described above. A computing system may receive a request to access a computing resource (block 504), and an authenticator may authenticate the user that submitted the request (block 506) as also described above, e.g., using login credentials and various user metadata or device metadata. If the authenticator cannot authenticate the user (block 508:N), then the computer system may reject the request to access the computing resource (block 510).

If the authenticator successfully authenticates the user (block 508:Y), however, then a session manager may create a new user session for the user (block 512) as also described above. A usage monitor may then initiate monitoring of the actions requested to be performed during that user session (block 514) that facilitates and manages access to the computing resource. As set forth above, the session manager may receive a request to perform an action at the computing resource (block 516), and the usage monitor may retrieve and apply one or more of the usage rules to the request (block 518). When applying a usage rule, the usage monitor determines whether the requested action violates the usage constraint of that usage rule (block 520). As noted above, the usage monitor may retrieve and analyze information describing actions previously performed by the user at the computing resource or at other computing resources when applying the usage rule. As one example, the usage monitor may retrieve and analyze information associated with a predetermined type of action (e.g., downloading a computer file or invoking a service) that has previously been performed in order to determine the frequency with which the user performs that type of action. Additional examples will be appreciated with the benefit of this disclosure.

If the usage monitor determines that the requested action does not violate the usage constraint of the applied usage rule (block 522:N), then the requested action may be performed at the computing resource and update the user session (block 524). As noted above, updating the user session may include logging or otherwise tracking the action performed such that it may be compared to subsequent actions the user requests to perform at the computing resource or other computing resources. Having performed the requested action, the usage monitor may wait for another request to perform an action is received from the user (block 516) and repeat these steps for that subsequent action. The usage monitor may, for example, transmit a response to the session manager that the requested action may be performed, and the session manager may facilitate performance of the action, e.g., by transmitting an instruction to the computing resource.

If, however, the usage monitor determines that the requested action violates a usage constraint (block 522:Y), then the usage monitor may instruct the session manager to halt performance of the requested action (block 526) as described above. The usage monitor may then notify another individual of the usage constraint violation (block 528), e.g., an administrator, in order to inform that individual that the usage constraint has been violated. Upon receipt of the usage constraint violation notification, that individual has the opportunity to review the action requested to be performed, the usage rule, and the usage constraint violated by the requested action. The individual may then determine whether the user should be permitted to or prevented from having the requested action performed at the computing resource. If the individual approves the requested action (block 530:Y), then the requested action may be performed at the computing resource and the user session may be updated (block 524) as described above. If, however, the individual does not authorize the requested action (block 530:N), then the requested action may not be performed at the computing resource (block 532). The usage monitor may, for example, transmit a response to the session manager that includes an instruction to deny, cancel, or otherwise discard the requested action. In some example implementations, the session manager may in turn transmit a response to the end-user computing device which may be presented to the user in order to inform the user that the requested action could not be performed. The response presented to the user may or may not include an explanation as to the reason the requested action could not be performed, e.g., that the action violates a usage constraint associated with the computing resource. Similarly the explanation may or may not identify the usage constraint and the usage rule applied depending on the level of security desired. In some example implementations, identification of the usage constraint and usage violation may depend on the user type of the user that submitted the request or other user-related criteria that will be appreciated with the benefit of this disclosure. If a requested action has been denied, the usage monitor may wait for another request to perform an action is received from the user (block 516) and repeat these steps for that subsequent action.

In some example implementations, the usage monitor may instruct the session manager to deny or otherwise cancel the request action if supplemental authorization is not received within a predetermined time period (e.g., 60 seconds). The usage monitor or the session manager may, for example, initiate a timer when the requested action is halted responsive to determining that the requested action violates a usage constraint. If the timer reaches zero before supplemental authorization is received, the session manager may automatically deny, cancel, or otherwise discard the requested action. In addition, the usage monitor may notify a security team when a usage constraint violation is not subsequently authorized. Upon receipt of the notification, the security team may initiate an investigation into the usage constraint violation. Furthermore the usage monitor may temporarily revoke the user's authorization to access to one or more computing resources when a usage constraint violation is not approved.

The approach to continuous access monitoring described above advantageously minimizes the intrusion of the usage monitor into the interactions between the user and the computing resource while ensuring that the user does not abuse the authorization to access that computing resource. It will be appreciated that the steps set forth above with reference to FIG. 5 described only by way of example. Other approaches to continuously monitoring access to a computing resource may include additional or alternative steps.

Figure 6:
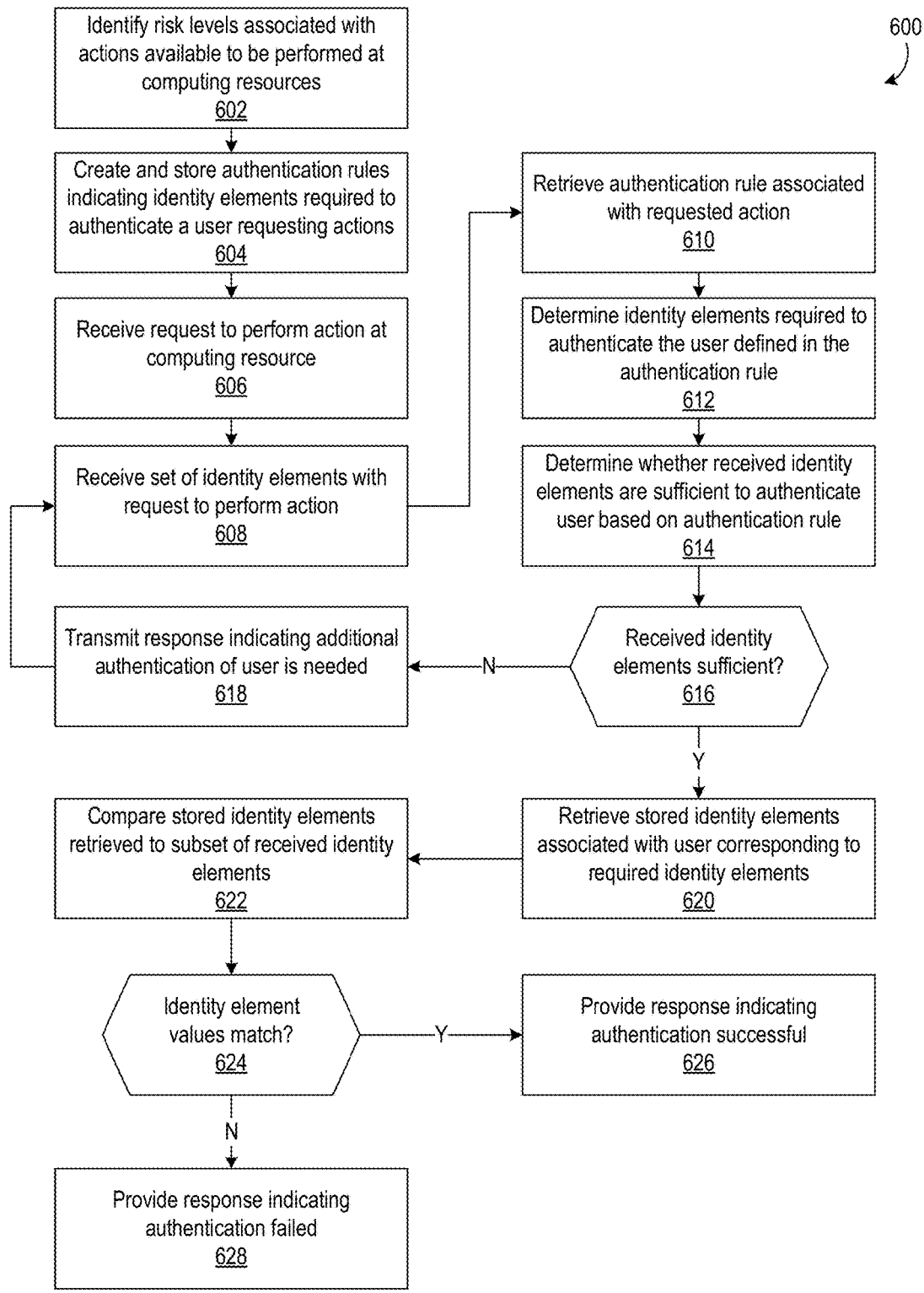
FIG. 6 is a flowchart of example method steps for authenticating a user in accordance with aspects of the disclosure.

Referring now to FIG. 6, a flowchart 600 of example method steps for authenticating a user in accordance with aspects of this disclosure is shown. As noted above, the level of authentication required to authenticate a user may depend on the risk associated with the action a user has requested to be performed at a computing resource. Accordingly respective risk levels associated with actions available to be performed may be identified (block 602) and authentication rules may be created and stored that indicate the identity elements required to authenticate a user requesting performance of those actions (block 604). As described above the identity elements may include various combinations of login credentials, user metadata, and device metadata.

A computing system may receive from an end-user computing device, a request to perform an action at a computing resource of the computing system (block 606). The computing system may also receive from the end-user computing device a set of identity elements with the request (block 608). An authenticator of the computing system may then retrieve one or more authentication rules associated with the requested action (block 610) and determine the identity elements required to authenticate the user defined in the authentication rule (block 612). As described above, the identity elements required to authenticate a user may be based on a risk level associated with the requested action, user metadata, device metadata, and the like. Security administrators may selectively configure the set of identity elements required to authenticate the user based on the level of security desired for the computing system.

Having retrieved the authentication rules associated with the requested action, the authenticator may determine whether the identity elements received are sufficient to authenticate the user based on the authentication rule (block 614). In particular, the authenticator may determine whether the set of received identity elements includes the required identity elements indicated in the authentication rule. If the received set of identity elements is not sufficient to authenticate the user (block 616:N), then a response may be transmitted to the end-user computing device indicating that additional authentication of the user is needed (block 618). As one example, the computing device or a corresponding application executing at the computing device may obtain one or more additional identity elements from the user, e.g.,  an OTP. Having obtained one or more additional identity elements, the end-user computing device may submit a new set of identity elements to the computing system for authentication of the user. The authenticator may thus repeat the steps described above to determine whether the new set of identity elements received are sufficient to authenticate the user based on the identity elements required by the authentication rule. As described above, the set of required identity elements sufficient to authenticate the user is a subset of the identity elements received from the user. The user, end-user computing device, and end-user application, however, do not know which particular combination of identity elements provided to the computing system with the access request are sufficient to authenticate the user.

If the authenticator determines that the set of received identity elements is sufficient to authenticate the user (block 616:Y), then the authenticator may retrieve a set of stored identity elements associated with the user that correspond to the required identity elements (block 620). The authenticator may then compare the set of stored identity elements to the set of required identity elements. If the values (or hash values) of the identity elements match (block 624:Y), then the authenticator may provide a response indicating that authentication of the user was successful (block 626). If one or more of the identity elements do not match, however, then the authenticator may provide a response indicating that authentication of the user has failed (block 628). The authenticator may, for example, provide the response to a session manager which may in turn create a user session for the user or facilitate performance of a requested action at a computing resource (e.g., if authentication was successful) or refrain from creating a user session or rejecting a request to perform an action (e.g., if authentication failed).

The approach to user authentication provided thus advantageously allows enterprise to configure their computing systems to require different degrees of authentication depending on the risk associated with the actions available to be performed at the computing resources. Furthermore by employing authentication rules, the set of identity elements required to authenticate a user may be modified if the desired level of security changes. It will be appreciated that the steps set forth above with reference to FIG. 6 described only by way of example. Other approaches to authenticating a user using authentication rules may include additional or alternative steps.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. The described implementation includes software but may be implemented as a combination of hardware and software or in hardware alone. Additionally, although aspects of the present disclosure are described as being stored in memory, one skilled in the art will appreciate that these aspects can also be stored on other types of computer-readable media, such as secondary storage devices, like hard disks, floppy disks, CD-ROM discs, flash memory sticks, and so forth.

What is claimed is:

1. A computer-implemented method of user authentication comprising:
   storing, at a data store of a first computing device, an authentication rule used to authenticate a user, the authentication rule indicating a plurality of sets of first identity elements, each set of first identity elements comprising a plurality of first identity elements used for

19 authentication of the user, wherein the plurality of sets of first identity elements comprises (i) a first set of first identity elements associated with a first user type, and (ii) a second set of first identity elements associated with a second user type different from the first user type;

receiving, at the first computing device from a second computing device operated by the user, a request that a computing resource perform an action;

receiving, at the first computing device from the second computing device, a set of second identity elements comprising one or more second identity elements usable for authentication of the user, wherein the second computing device and the user are unaware of which first identity elements need to be submitted for the first computing device to grant the request;

selecting, by the first computing device and from among the plurality of sets of first identity elements, a set of first identity elements to use for authentication of the user;

performing, by the first computing device, an authentication attempt by verifying, for each first identity element of the set of first identity elements selected, a second identity element, of the set of second identity elements received, which corresponds to that first identity element; and based on unsuccessful authentication of the user, indicating, by the first computing device, that at least one additional identity element is needed in order to grant the request, but without identifying the at least one additional identity element to the second computing device or the user.

2. The computer-implemented method of claim 1, wherein:
the first computing device selects the set of first identity elements at random from the plurality of sets of first identity elements.

3. The computer-implemented method of claim 1, wherein:
the first computing device selects one of the first or second sets of first identity elements as the set of first identity elements based on a user type of the user.

4. The computer-implemented method of claim 1, wherein:
the plurality of sets of first identity elements comprises (i) a first set of second identity elements associated with a first action type, and (ii) a second set of second identity elements associated with a second action type different from the first action type; and
the first computing device selects one of the first or second sets of second identity elements as the set of first identity elements based on an action type of the action requested.

5. The computer-implemented method of claim 1, wherein:
the plurality of sets of first identity elements comprises (i) a first set of second identity elements associated with a first timeframe, and (ii) a second set of second identity elements associated with a second timeframe different from the first timeframe; and
the first computing device selects one of the first or second sets of second identity elements as the set of first identity elements based on a timeframe during which the request was received.

6. The computer-implemented method of claim 5, wherein:

20 the first and second timeframes each comprise at least one of a day-of-the-week or a time-of-day.

7. The computer-implemented method of claim 5, wherein:
the first timeframe comprises a previous timeframe within which the user previously requested one or more computing resources perform one or more actions.

8. The computer-implemented method of claim 1, wherein:
the plurality of sets of first identity elements comprises (i) a first set of second identity elements associated with a first geographic location, and (ii) a second set of second identity elements associated with a second geographic location different from the first geographic location; and
the first computing device selects one of the first or second sets of second identity elements as the set of first identity elements based on a geographic location of the user.

9. The computer-implemented method of claim 1, wherein:
the plurality of sets of first identity elements comprises (i) a first set of second identity elements associated with a first device location, and (ii) a second set of second identity elements associated with a second device location different from the first device location; and
the first computing device selects one of the first or second sets of second identity elements as the set of first identity elements based on a location of the second computing device operated by the user.

10. The computer-implemented method of claim 9, wherein:
the first device location is internal to a network within which the first computing device resides; and
the second device location is external to that network.

11. A computing device comprising:
one or more processors;
a data store storing an authentication rule used to authenticate a user, the authentication rule indicating a plurality of sets of first identity elements, each set of first identity elements comprising a plurality of first identity elements used for authentication of the user, wherein the plurality of sets of first identity elements comprises (i) a first set of first identity elements associated with a first user type, and (ii) a second set of first identity elements associated with a second user type different from the first user type; and
memory storing executable instructions that, when executed by the one or more processors, cause the computing device to:
receive, from a second computing device operated by a user, a request that a computing resource perform an action;
receive, from the second computing device, a set of second identity elements comprising one or more second identity elements usable for authentication of the user, wherein the second computing device and the user are unaware of which first identity elements need to be submitted for the computing device to grant the request;
select, from among the plurality of sets of first identity elements, a set of first identity elements;
perform, an authentication attempt by verifying, for each first identity element of the set of first identity elements selected, a second identity element, of the set of second identity elements received, which corresponds to that first identity element;

based on successful authentication of the user, grant the request; and based on unsuccessful authentication of the user, indicate, that at least one additional identity element is needed in order to grant the request, but without identifying the at least one additional identity element to the second computing device or the user.

12. The computing device of claim 11, wherein:
the computing device selects the set of first identity elements at random from the plurality of sets of first identity elements.

13. The computing device of claim 11, wherein:
the computing device selects one of the first or second sets of first identity elements as the set of first identity elements based on a user type of the user.

14. The computing device of claim 11, wherein:
the plurality of sets of first identity elements comprises (i) a first set of second identity elements associated with a first action type, and (ii) a second set of second identity elements associated with a second action type different from the first action type; and
the computing device selects one of the first or second sets of second identity elements as the set of first identity elements based on an action type of the action requested.

15. The computing device of claim 11, wherein:
the plurality of sets of first identity elements comprises (i) a first set of second identity elements associated with a first timeframe, and (ii) a second set of second identity elements associated with a second timeframe different from the first timeframe; and
the computing device selects one of the first or second sets of second identity elements as the set of first identity elements based on a timeframe during which the request was received.

16. The computing device of claim 15, wherein:
the first and second timeframes each comprise at least one of a day-of-the-week or a time-of-day.

17. The computing device of claim 15, wherein:
the first timeframe comprises a previous timeframe within which the user previously requested one or more computing resources perform one or more actions.

18. The computing device of claim 11, wherein:
the plurality of sets of first identity elements comprises (i) a first set of second identity elements associated with a first geographic location, and (ii) a second set of second identity elements associated with a second geographic location different from the first geographic location; and
the computing device selects one of the first or second sets of second identity elements as the set of first identity elements based on a geographic location of the user.

19. The computing device of claim 11, wherein:
the plurality of sets of first identity elements comprises (i) a first set of second identity elements associated with a first device location, and (ii) a second set of second identity elements associated with a second device location different from the first device location; and
the computing device selects one of the first or second sets of second identity elements as the set of first identity elements based on a location of the second computing device operated by the user.

20. The computing device of claim 19, wherein:
the first device location is internal to a network within which the computing device resides; and
the second device location is external to that network.

* * * * *